United States Patent
Burch, Jr. et al.

(10) Patent No.: US 10,679,106 B2
(45) Date of Patent: Jun. 9, 2020

(54) DUAL-SIDED PRODUCT PLACEMENT AND INFORMATION STRIPS

(71) Applicant: Electronic Imaging Services, Inc., Little Rock, AR (US)

(72) Inventors: Ronald Roger Burch, Jr., Lonoke, AR (US); Christopher David Frensley, North Little Rock, AR (US); Paul Douglas Brooking, Glendale, MO (US)

(73) Assignee: Electronic Imaging Services, Inc., Little Rock, AR (US)

( * ) Notice: Subject to any disclaimer, the term of this patent is extended or adjusted under 35 U.S.C. 154(b) by 104 days.

(21) Appl. No.: 15/654,755

(22) Filed: Jul. 20, 2017

(65) Prior Publication Data

US 2019/0026612 A1   Jan. 24, 2019

(51) Int. Cl.
*G06K 19/02* (2006.01)
*G06K 19/06* (2006.01)
*B65D 73/00* (2006.01)
*G06K 19/077* (2006.01)

(52) U.S. Cl.
CPC ... *G06K 19/06093* (2013.01); *B65D 73/0028* (2013.01); *G06K 19/025* (2013.01); *G06K 19/06028* (2013.01); *G06K 19/0776* (2013.01)

(58) Field of Classification Search
CPC .... G06K 15/02; G06K 15/021; G06K 15/022; G06K 15/024; B42D 15/00; B42D 15/0053; B42D 15/0093; G09F 1/04; G09F 3/204; G09F 2003/02; G09F 2003/0201; G09F 2003/0202
See application file for complete search history.

(56) References Cited

U.S. PATENT DOCUMENTS

| | | | |
|---|---|---|---|
| 3,767,039 A | 10/1973 | Schroter | |
| 4,188,250 A | 2/1980 | Grass | |
| 5,498,087 A * | 3/1996 | Wey | G06K 15/02 358/1.18 |
| 5,948,494 A | 9/1999 | Levin | |
| 6,269,342 B1 | 7/2001 | Brick | |
| 6,921,453 B2 | 7/2005 | Dronzek | |

(Continued)

FOREIGN PATENT DOCUMENTS

| | | |
|---|---|---|
| WO | 2002100655 | 12/2002 |
| WO | 2015112615 | 7/2015 |
| WO | 2015112620 | 7/2015 |

*Primary Examiner* — Thien M Le
*Assistant Examiner* — April A Taylor
(74) *Attorney, Agent, or Firm* — Sheppard Mullin Richter & Hampton LLP

(57) ABSTRACT

A single dual-sided product placement and information strip includes a first side with product information for consumers and a second side with product placement information for placing products on a display shelf. The dual-sided product placement and information strip enables information necessary for consumers to be printed on the first (consumer-facing) side and information that assists stockers to place products on shelves to be printed on the second (opposing) side. Also disclosed are systems and methods for formatting and printing the dual-sided product placement and information strips. The single dual-sided product placement and information strip may be printed alone or in a single sheet along with one or more other dual-sided product placement and information strips.

17 Claims, 13 Drawing Sheets

(56) References Cited

U.S. PATENT DOCUMENTS

| | | | |
|---|---|---|---|
| 7,287,001 B1 | 10/2007 | Falls | |
| 8,261,477 B1 | 9/2012 | Wilkinson | |
| 8,273,436 B2 | 9/2012 | Flynn | |
| 8,599,437 B2 * | 12/2013 | Yanagisawa | G06K 1/121 |
| | | | 358/1.11 |
| 8,626,613 B2 | 1/2014 | Dale | |
| 8,836,990 B1 | 9/2014 | Dale | |
| 8,885,204 B1 | 11/2014 | Dale | |
| D720,002 S | 12/2014 | Weidauer | |
| D720,003 S | 12/2014 | Weidauer | |
| 8,970,893 B1 | 3/2015 | Dale | |
| 9,376,286 B1 * | 6/2016 | Browning | B31D 1/026 |
| 9,613,547 B2 * | 4/2017 | Weiner | G09F 3/10 |
| 2004/0090642 A1 * | 5/2004 | Hikita | B41J 3/01 |
| | | | 358/1.11 |
| 2004/0135364 A1 | 7/2004 | Dale | |
| 2006/0017278 A1 | 1/2006 | Wood | |
| 2007/0120360 A1 | 5/2007 | Busam | |
| 2007/0164554 A1 | 7/2007 | Krone | |
| 2008/0095963 A1 | 4/2008 | Robbins | |
| 2008/0095964 A1 | 4/2008 | Wilkinson | |
| 2008/0255894 A1 | 10/2008 | Falls | |
| 2009/0234668 A1 * | 9/2009 | Wheeler | G06Q 10/087 |
| | | | 705/346 |
| 2010/0212195 A1 * | 8/2010 | Nunez | G09F 3/202 |
| | | | 40/5 |
| 2011/0066458 A1 | 3/2011 | Dale | |
| 2011/0283578 A1 | 11/2011 | Engelby | |
| 2013/0144757 A1 | 6/2013 | Bauer | |
| 2013/0173435 A1 * | 7/2013 | Cozad, Jr. | G06Q 10/087 |
| | | | 705/28 |
| 2014/0366413 A1 | 12/2014 | Weidauer | |
| 2014/0366414 A1 | 12/2014 | Weidauer | |
| 2014/0367017 A1 | 12/2014 | Blackwell | |
| 2014/0367034 A1 | 12/2014 | Weidauer | |
| 2014/0367471 A1 | 12/2014 | Weidauer | |
| 2014/0367472 A1 | 12/2014 | Weidauer | |
| 2014/0367956 A1 | 12/2014 | Wilkinson | |
| 2015/0000819 A1 | 1/2015 | Blackwell | |
| 2015/0043016 A1 | 2/2015 | Randall | |
| 2015/0202907 A1 | 7/2015 | Dale | |

* cited by examiner

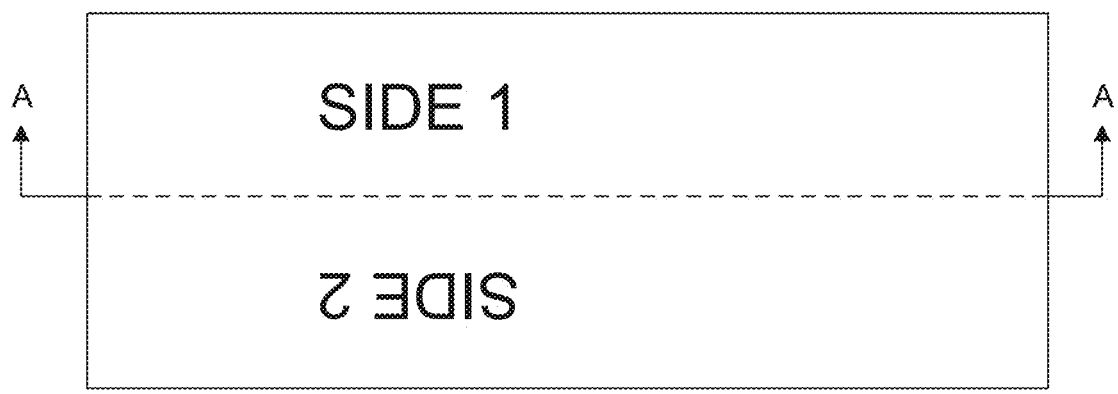
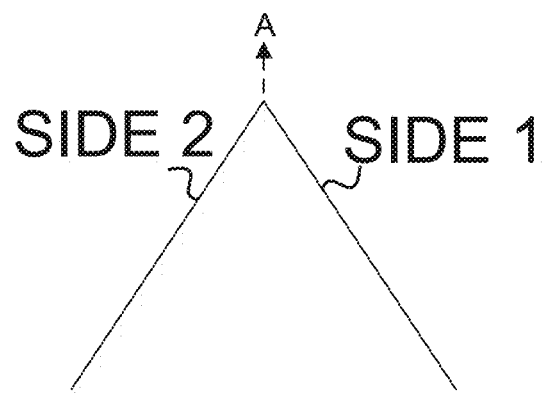
FIG. 3

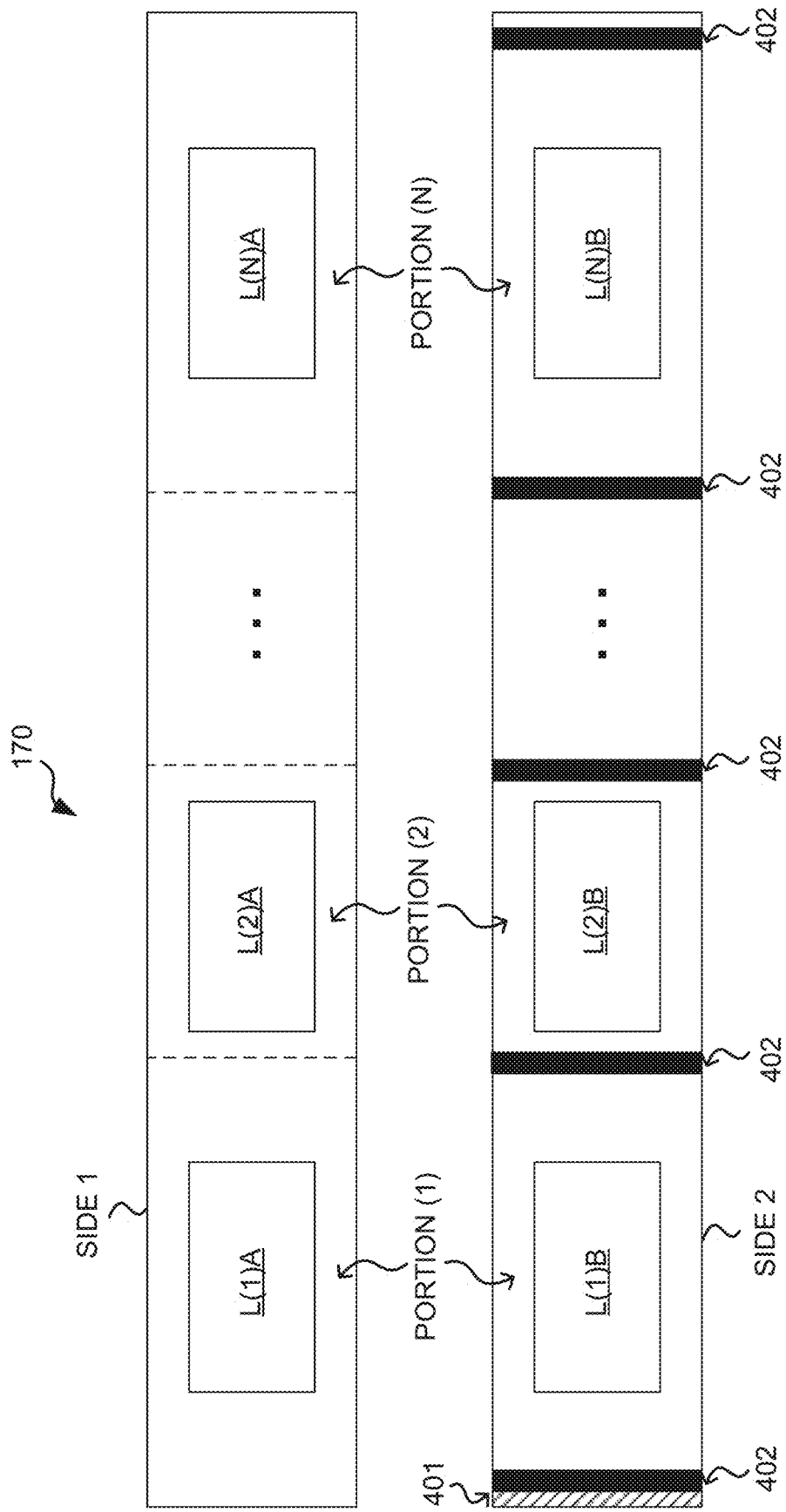

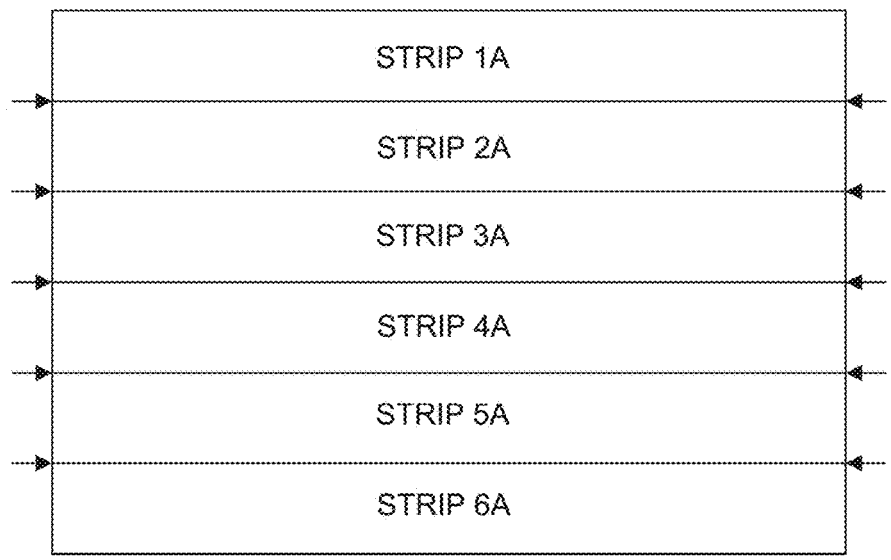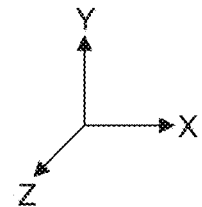
FIG. 5A
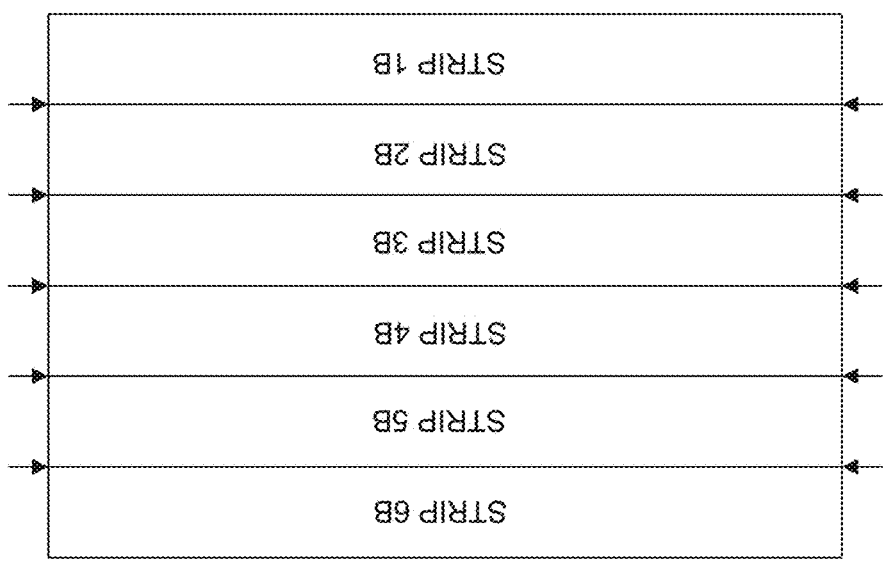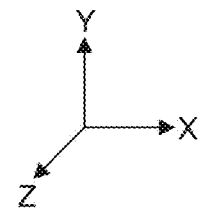
FIG. 5B

DUAL-SIDED PRODUCT PLACEMENT AND INFORMATION STRIPS

FIELD OF THE INVENTION

The invention relates to dual-sided product placement and information strips each having a first side with product information for consumers and a second side with product placement information for placing products on a display shelf, and systems and methods for formatting and printing the dual-sided product placement and information strips.

BACKGROUND OF THE INVENTION

Stocking shelves can be an inaccurate and time-consuming process. Various product placement strips and associated systems and methods have been developed to increase the efficiency with which stocking personnel can stock shelves and other display areas. However, these strips may begin to have extraneous markings on consumer-facing sides of the strips to help stocking personnel place products on shelves. Furthermore, the limited space on consumer-facing sides of the strips may limit what can be printed to help stocking personnel place products on shelves. These and other drawbacks exist with conventional product stocking strips and associated systems and methods.

SUMMARY OF THE INVENTION

A single dual-sided product placement and information strip (referred to interchangeably herein as a dual-sided strip) includes a first printed surface on one side and a second printed surface on the other side. A consumer-facing product information side includes a first printed surface having printed product information, at least some of which may be required by law by various jurisdictions such as local or federal governments. A product placement side (opposite the consumer-facing product information side) includes a second printed surface having printed indicators that assist personnel to place products on a product shelf. The printed indicators may include, for example, an image of a product, a boundary indicator that indicates an amount of horizontal and/or vertical display space that the product should occupy, a location of the dual-sided strip, a type of display used (e.g., shelf, peg-board, etc.), a number of faces of the product, and/or other information that assists stocking personnel to place products on a product shelf Various examples throughout this disclosure may describe a product shelf for illustrative and not limiting purposes. For example, various implementations of the invention may be used in connection with other product displays such as, for example, pegboard-based product displays. The dual-sided strip may be secured to the product shelf (or other product display component) such that the product placement side faces the product shelf and the consumer-facing product information side faces away from the shelf. In other words, in various implementations, when a dual-sided strip is secured to a product shelf, only the consumer-facing product information side is intended to be visible from an aisle. Typically, although not necessarily, a single dual-sided strip has printed thereon product information (on one side) and placement information (on the other side) for a plurality of products to be placed on a shelf.

A dual-sided strip may be printed in a horizontal orientation to be placed horizontally along a single shelf row (e.g., row of products) or in a vertical orientation to be placed vertically along multiple rows of shelves (e.g., rows of products). For instance, for horizontal applications in which the dual-sided strip is wider than it is tall when secured to a product shelf, information will be printed such that product information and corresponding placement information for different products will be printed side-to-side (e.g., product information for one side is printed to the left or right of product information for another product). For vertical applications in which the dual-sided strip is taller than it is wide when secured to a product display, information will be printed such that product information and corresponding placement information for different products will be printed top-to-bottom (e.g., product information for one side is printed above or below product information for another product).

In some implementations, to assist with product placement while stocking shelves, the product placement information may be printed upside down (i.e., inverted 180 degrees; also referred to herein as "inverted") relative to the product information. This allows the stocking personnel to conveniently flip the dual-sided strip upward or downward to switch back and forth to review the product information or the placement information while stocking product shelves. In other implementations, the product placement information may be printed right-side up relative to the product information. In this example, the stocking personnel is able to flip the dual-strip strip leftward or rightward to switch back and forth to review the product information or the placement information while stocking product shelves.

In some implementations, a single dual-sided strip may be printed individually. In some of these implementations, single dual-sided strips may be printed in batches based on the display shelves onto which they are to be secured (so that batches may be grouped according to their intended display locations). In some implementations, multiple dual-sided strips may be printed in a sheet and each dual-sided strip is cut out or otherwise separated from the sheet. In some of these implementations, a given sheet of dual-sided strips may be printed based on the display shelves onto which they are to be secured (so that a sheet of dual-sided strips may be printed according to intended display locations).

Generally speaking, a dual-sided strip may be generated by formatting graphics, text, and/or other content into a layout to be printed onto the dual-sided strip. Various systems and methods facilitate these and other aspects of a dual-sided strip. For example, the system may include a client device, a composer computer system that generates print instructions, a printer device that receives the print instructions and prints the dual-sided strip, and/or other components.

In some implementations, the client device may operate within a retail location. Alternatively or additionally, the client device may operate in locations remote from the retail location. Although various examples will be illustrated as being implemented in a retail setting such as a retail location (e.g., a retail store), the dual-sided strips and systems and methods of generating these strips may be implemented in other contexts in which items are stored or displayed. For example, distributors, shippers, and others may use the dual-sided strips to store or otherwise display items. In these implementations, the product information may include other information relevant to warehouses, shippers, etc. The retail location may include a planogram database, which may be located onsite or offsite. The planogram database may include a map of the retail location, locations of products within retail location, and/or other conventional planogram information.

The composer computer system may include various components to format dual-sided strips. For example, the composer computer system may include a strip editor and a printer interface. The strip editor may generate instructions for printing a new dual-sided strip and/or update existing instructions for a dual-sided strip. The strip editor may generate print instructions for generating the dual-sided strip (hereinafter interchangeably referred to as "dual-sided strip print instructions" or "set of dual-sided strip print instructions" in which a set of dual-sided strip print instructions correspond to print instructions for printing a single dual-sided strip) based on the formatting.

The strip editor may generate dual-sided strip print instructions for a new dual-sided strip based on input from a user through a graphical user interface and/or automatically without user intervention based on planogram or other product placement information. In an implementation, dual-sided labels for individual products may be formatted individually and then added to dual-sided strip print instructions for a given dual-sided strip. For example, the strip editor may generate dual-sided label instructions for a product. In this implementation, dual-sided label instructions may correspond to a single product. The dual-sided label instructions may be stored in a database, such as a dual-sided strip database. Such stored label instructions may be selected from the database and later added to a given set of dual-sided strip instructions.

In some implementations, the strip editor may obtain planogram information, populate a dual-sided strip template based on the planogram information, and allow the In an implementation, the strip editor may include multiple dual-sided label instructions into a set of dual-sided strip instructions. In this manner, a single dual-sided strip printed using the dual-sided strip instructions may have printed thereon information for a plurality of products. It should be noted that each set of dual-sided label instructions may be separately stored as a discreet instructions for a corresponding product.

For human-formatted dual-sided strips, the strip editor may generate a user interface that includes various display options configured to receive input to design a dual-sided strip. For automatically generated (without human design intervention) dual-sided strips, the strip editor may obtain planogram information for a portion or all of a retail location and automatically format dual-sided strips for each. Doing so assumes that the necessary product information and product placement information is available, such as from the planogram database or the dual-sided strip database.

In some implementations, the dual-sided print instructions may be provided to the printer interface, which generates printer readable encodings for a printer device. The printer readable encodings may include printer-specific instructions (such instructions from a printer driver) or general instructions (such as a PostScript or other format).

The printer device may include an inkjet printer, a laser printer, and/or other type of printer configured to print on a dual-sided strip substrate described herein. The printer device may be include a single print head or two or more print heads (e.g., dual print head). Single print head implementations may print a single side at a time and automatically or manually reverse the dual-sided strip substrate for printing the other side, while dual print head implementations may print both sides at a time or a single side at a time without having to automatically or manually reverse the dual-sided strip substrate for printing the other side.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3 illustrates an exemplary dual-sided product placement and information strip, according to an implementation of the invention.

FIG. 4A illustrates an exemplary dual-sided product placement and information strip comprising a plurality of dual-sided labels each corresponding to a product, according to an implementation of the invention.

FIG. 5A illustrates a first side of a sheet of dual-sided product placement and information strip, according to an implementation of the invention.

FIG. 5B illustrates a second side of a sheet of dual-sided product placement and information strip, according to an implementation of the invention.

DETAILED DESCRIPTION OF THE INVENTION

Figure 1:
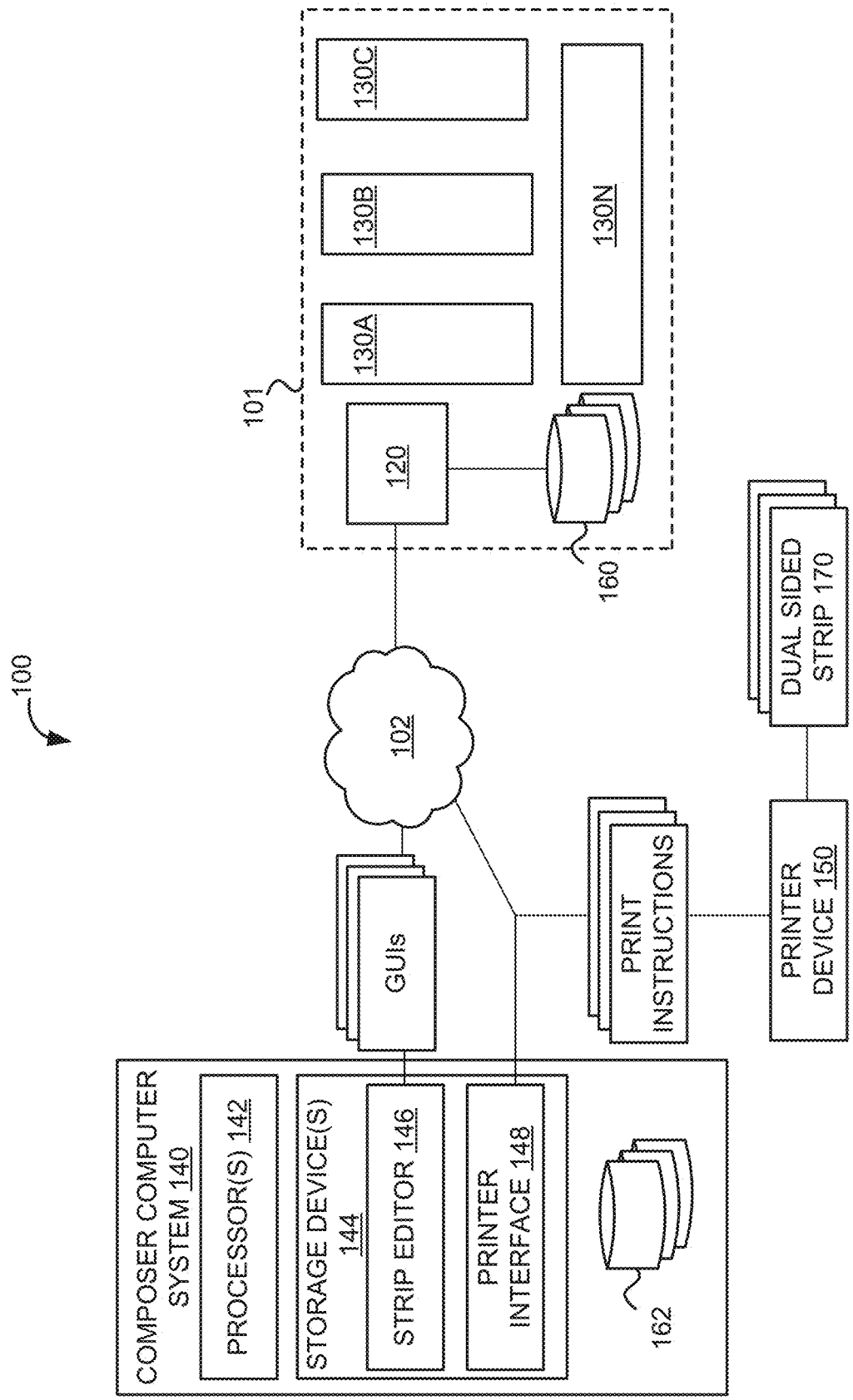
FIG. 1 illustrates an exemplary system for generating a dual-sided product placement and information strip, according to an implementation of the invention.

The invention described herein relates to a system and method of generating and using a dual-sided product placement and information strip. A single dual-sided product placement and information strip (referred to interchangeably herein as a dual-sided strip) includes a first printed surface on one side and a second printed surface on the other side. A consumer-facing product information side includes a first printed surface having printed product information, at least some of which may be required by law by various jurisdictions such as local or federal governments. Examples of product information include, without limitation, a price, a unit price, a product description, a product size, a product identifier such as a Universal Product Code ("UPC"), a barcode that encodes the product identifier, and/or other information for a consumer.

A product placement side (opposite the consumer-facing product information side) includes a second printed surface having printed indicators that assist personnel to place products on a product shelf. Examples of product placement information include, without limitation, space requirements (e.g., width of space on the display shelf reserved for the product, number of facings, etc.), shelf number/location, image of the product, and/or other information that provides indicators of where the product should be shelved.

Various examples throughout this disclosure may describe a product shelf for illustrative and not limiting purposes. For example, various implementations of the invention may be used in connection with other product displays such as, for example, pegboard-based product displays.

The dual-sided strip may be secured to the product shelf (or other product display component) such that the product placement side faces the product shelf and the consumer-facing product information side faces away from the shelf. In other words, in various implementations, when a dual-sided strip is secured to a product shelf, only the consumer-facing product information side is intended to be visible from an aisle. Typically, although not necessarily, a single dual-sided strip has printed thereon product information (on one side) and placement information (on the other side) for a plurality of products to be placed on a shelf.

A dual-sided strip may be printed in a horizontal orientation to be placed horizontally along a single shelf row (e.g., row of products) or in a vertical orientation to be placed vertically along multiple rows of shelves (e.g., rows of products). For instance, for horizontal applications in which the dual-sided strip is wider than it is tall when secured to a product shelf, information will be printed such that product information and corresponding placement information for different products will be printed side-to-side (e.g., product information for one side is printed to the left or right of product information for another product). For vertical applications in which the dual-sided strip is taller than it is wide when secured to a product display, information will be printed such that product information and corresponding placement information for different products will be printed top-to-bottom (e.g., product information for one side is printed above or below product information for another product).

In some implementations, to assist with product placement while stocking shelves, the product placement information may be printed upside down relative to the product information. This allows the stocking personnel to conveniently flip the dual-sided strip upward or downward to switch back and forth to review the product information or the placement information while stocking product shelves. In other implementations, the product placement information may be printed right-side up relative to the product information. In this example, the stocking personnel is able to flip the dual-strip strip leftward or rightward to switch back and forth to review the product information or the placement information while stocking product shelves.

In some implementations, a single dual-sided strip may be printed individually. In some of these implementations, single dual-sided strips may be printed in batches based on the display shelves onto which they are to be secured (so that batches may be grouped according to their intended display locations). In some implementations, multiple dual-sided strips may be printed in a sheet and each dual-sided strip is cut out or otherwise separated from the sheet. In some of these implementations, a given sheet of dual-sided strips may be printed based on the display shelves onto which they are to be secured (so that a sheet of dual-sided strips may be printed according to intended display locations).

Exemplary Dual-Sided Strip Configurations

Figure 2:
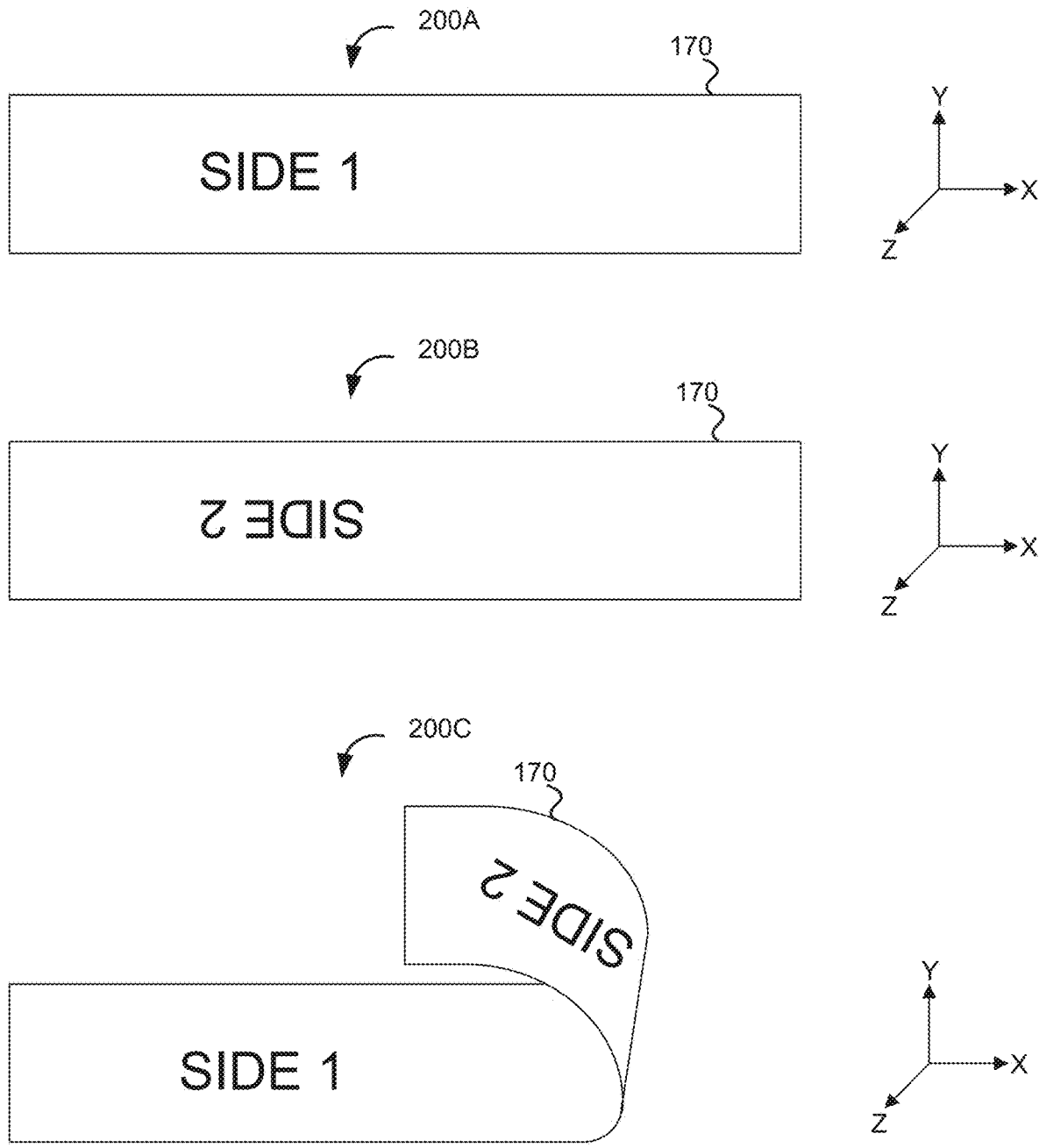
FIG. 2 illustrates various high level views of a dual-sided product placement and information strip, according to an implementation of the invention.

Dual-sided strips may be configured in various ways. For example, FIG. 2 illustrates various high level views 200A-C of a dual-sided product placement and information strip 170, according to an implementation of the invention. In the illustrated implementation, a dual-sided strip may include a first side ("SIDE 1") and a second side ("SIDE 2") that is printed on a single substrate inverted with respect to the first side. View 200A illustrates the first side, view 200B illustrates the second side, and view 200C illustrates a folded over dual-sided strip for perspective. An XYZ orientation legend is also illustrated for orientation purposes. In other implementations, the second side may be printed in the same orientation (i.e., not inverted). In either alternative, the first and second sides may be printed on either side of a single substrate. The substrate may be composed of various materials such as, without limitation, polyester film (e.g., Mylar™ film), paper, and/or other material that can be printed on as described herein.

FIG. 3 illustrates an exemplary dual-sided product placement and information strip, according to an implementation of the invention. Unlike the illustrated implementation of FIG. 2, the two sides of the dual-sided strip illustrated in FIG. 3 are printed on the same side of the substrate and then folded. Like the dual-sided strip illustrated in FIG. 2, the second side of the dual-sided strip may be printed either inverted relative to the first side or not inverted relative to the first side. Unlike the dual-sided strip illustrated in FIG. 2, the strip illustrated in FIG. 3 may result in excess use of substrate material but may avoid the necessity of printing on each side of the substrate.

FIG. 4A illustrates an exemplary dual-sided product placement and information strip 170 comprising a plurality of dual-sided labels L(1 . . . N) each corresponding to a product, according to an implementation of the invention. Each side ("SIDE 1" and "SIDE2") of the dual-sided strip 170 are illustrated adjacent to one another for clarity. As illustrated in FIG. 2, SIDE 1 and SIDE 2 are printed on either side of a single substrate.

In the illustrated implementation, the dual-sided strip 170 may be composed of a plurality of dual-sided labels (collectively referred to as "L(N)" for convenience). Each dual-sided label L(N) may correspond to a product to be displayed. Each dual-sided label L(N) may have two sides, with each side (A,B) having either product information or product placement information. The product information side of a given dual-sided label L(N)(A) may be aligned on the same side of the dual-sided strip 170 with other product information sides of other dual-sided labels L(N)(A). Likewise, the product placement information side of a given dual-sided label L(N)(B) may be aligned on the same side of the dual-sided strip 170 with other product placement information sides of other dual-sided labels L(N)(B).

In an implementation, each dual-sided label L(N) may be allocated a dual-sided portion (illustrated as PORTION 1-N) of the dual-sided strip 170 in which to occupy. For example, strip editor 146 may allocate a first dual-sided portion (PORTION (1)) of the dual-sided product strip for the first dual-sided label L(1). First product information for a product corresponding to the first dual-sided label L(1) is allocated to be printed on a side of the first dual-sided portion corresponding to the product information side of the dual-sided product strip and the first product placement information for the product corresponding to the first dual-sided label L(1) is allocated to be printed on a side of the first dual-sided portion corresponding to the product placement information side of the dual-sided product strip.

Strip editor 146 may make such allocations based on a space requirement of the corresponding product. For example, the corresponding product for a dual-sided label may occupy a certain width of a display shelf (which may be indicated by a product width and number of facings—i.e., number of products to display side-by-side on the display shelf). Strip editor 146 may accordingly allocate a portion of the dual-sided strip for a dual-sided label based on the space requirement of a product. Strip editor 146 may identify a position of the allocated portion based on the position of prior portions already allocated for the dual-sided strip. For example, strip editor 146 may maintain, for each dual-sided strip being formatted by placing a plurality of dual-sided labels on the strip, a measurement counter that increments a width counter based on the width of previous dual-sided labels already allocated to the dual-sided strip.

In an implementation, the product placement information side of each dual-sided label may include one or more boundary indicators 402. Such boundary indicators may indicate the boundary of a corresponding product to be displayed. In this manner, stocking personnel may use the boundary indicators 402 to position products on shelves.

Figure 4B:
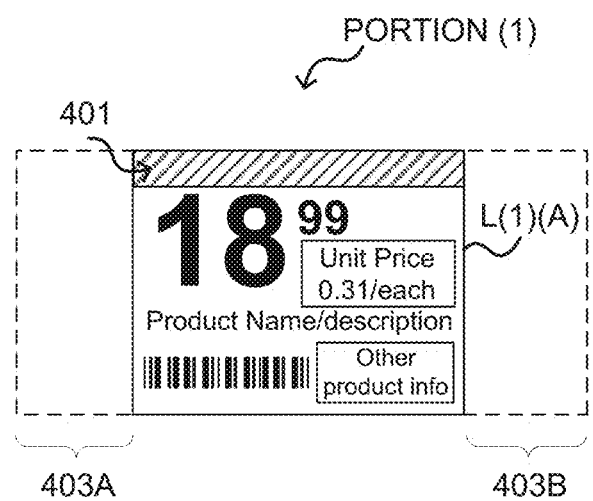
FIG. 4B illustrates an exemplary product information side of a dual-sided label for a product, according to an implementation of the invention.

FIG. 4B illustrates an exemplary product information side (L(1)(A)) of a dual-sided label for a product, according to an implementation of the invention. Each label may occupy a portion (PORTION(1)) of a dual-sided strip. As illustrated, the product information side of PORTION(1) may include the product information side of a dual-sided label L(1)(A), a left-side spacing 403A, and a right-side spacing 403B. In some implementations, each dual-sided label has a fixed width that does not change. As such, depending on the width of the space to be occupied by a product on a display shelf (hereinafter, also referred to as a "product shelf width"), strip editor 146 may allocate spacers 403A and 403B to fill in any space not occupied by a dual-sided label (either or both spacers 403A,B may be zero in some instances). In some implementations, a dual-sided label is centered within its allocated portion, in which case spacers 403A and 403B are equal to one another. Other configurations (such as left-justified and right justified) may be used as well. Either of these configurations may be automatically generated based on one or more formatting rules, manual input by a user designing dual sided strips, templates for generating dual-sided strips, and/or other input techniques. In some implementations, a dual-sided label may have a variable width and spacers 403A and 403B may similarly be adjusted.

The product information side of a dual-sided label may include, without limitation, an upper indicator 401, a price (illustrated as 18.99), a unit price, a product name, a product description, a machine readable code such as a barcode, and/or other product information. Some of all of this information may be required to be presented to consumers by various governmental agencies/regulations.

Figure 4C:
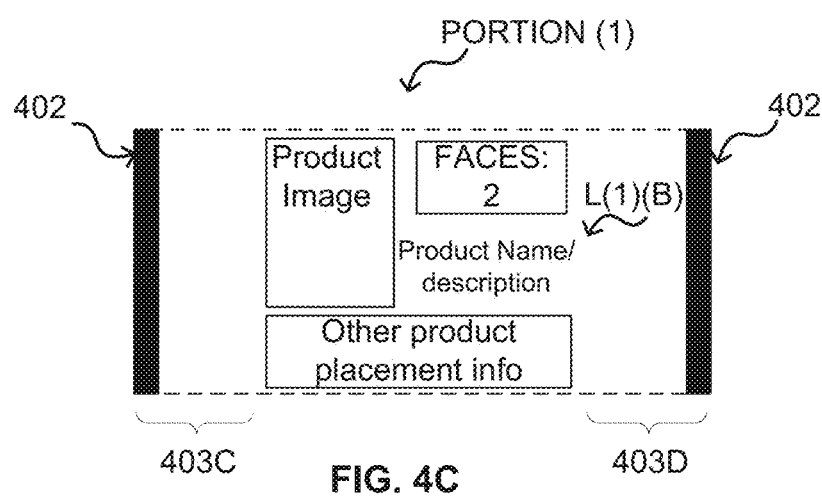
FIG. 4C illustrates an exemplary product placement information side of the dual-sided label for the product, according to an implementation of the invention.

FIG. 4C illustrates an exemplary product placement information side (L(1)(B)) of the dual-sided label for the product, according to an implementation of the invention. As mentioned above, each label may occupy a portion (PORTION (1)) of a dual-sided strip. As illustrated, the product placement information side of PORTION(1) may include the product placement information side of a dual-sided label L(1)(B), a left-side spacing 403C, and a right-side spacing 403D. In some implementations, each dual-sided label has a fixed width that does not change. As such, depending on the width of the space to be occupied by a product on a display shelf (hereinafter, also referred to as a "product shelf width"), strip editor 146 may allocate spacers 403C and 403D to fill in any space not occupied by a dual-sided label (either or both spacers 403C,D may be zero in some instances). In some implementations, a dual-sided label is centered within its allocated portion, in which case spacers 403C and 403D are equal to one another. Other configurations (such as left-justified and right justified) may be used as well. Either of these configurations may be automatically generated based on one or more formatting rules, manual input by a user designing dual sided strips, templates for generating dual-sided strips, and/or other input techniques. In some implementations, a dual-sided label may have a variable width and spacers 403C and 403D may similarly be adjusted.

The product placement information side of a dual-sided label may include, without limitation, one or more boundary indicators 402, a product image, a face count indicator (as illustrated 2 faces for a corresponding product) a product name, a product description, and/or other product placement information. Some of the other information (not illustrated) may include, without limitation, a revision date, a planogram identifier, a location identifier (e.g., a bay, aisle, and/or shelf identifier), a type of display (e.g., shelf, peg, etc.), an indication of the height from the floor at which the dual-sided strip is to be displayed, a position along shelf at which the strip should be placed, and/or other information). At least some of the product placement information may be the same as the product information printed on the reverse side. In other instances, none of the product placement information is the same as the product information printed on the reverse side.

In some implementations, the product information side and the product placement information side may occupy different widths of a dual-sided label. For instance, the product placement information side may have a spacer 403C that is less than a spacer 403A or vice versa. Alternatively or additionally the product placement information side may have a spacer 403D that is less than a spacer 403B or vice versa.

Figure 4D:
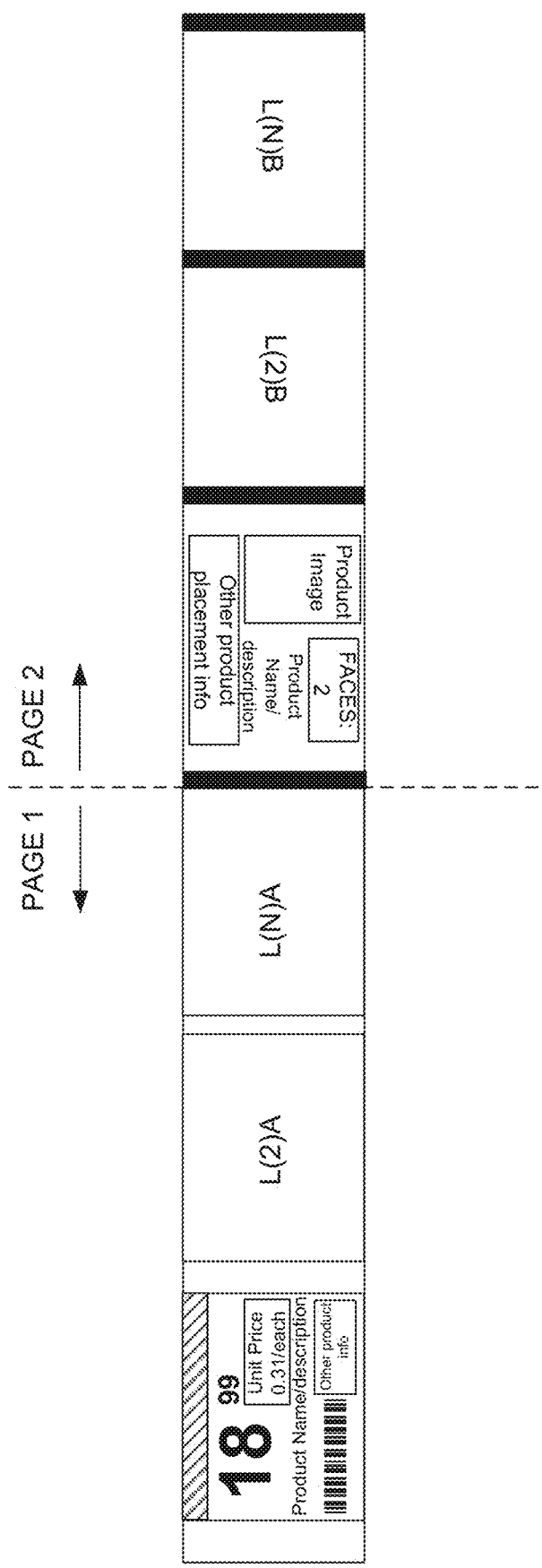
FIG. 4D illustrates an exemplary pagination scheme for a dual-sided product placement and information strip, according to an implementation of the invention.

FIG. 4D illustrates an exemplary pagination scheme for a dual-sided product placement and information strip, according to an implementation of the invention.

In some implementations, strip editor 146 may generate print instructions such as a PDF file, a postscript file, and/or other type of file that can be sent to a printer device for printing (specifically, the print instructions may be provided to printer interface 148 (e.g., a device driver) that may generate printer executable code for printing the print instructions.

In some implementations, strip editor 146 may paginate the formatted strips (e.g., the labels added to a dual-sided strip). Such pagination may be used to print the dual-sided strip on either side of a substrate. For example, strip editor 146 may format the product information side of the dual-sided strip to be on a first page of the print instructions. Strip editor 146 may format the product placement information side of the dual-sided strip to be on a second page of the print instructions. In this example, strip editor 146 may include an instruction to print the first and the second pages dual-sided on a substrate. In the illustrated implementation, strip editor 146 may invert the product placement information side of each label relative to product information side of each label so that when the printer instructions are transmitted to a printer device, a dual-sided strip is printed without the printer device having to perform additional transformations of the data (other than conventional dual-sided printing).

To achieve the foregoing inversions, strip editor 146 may obtain a plurality of dual-sided labels for a dual-sided strip. The dual-sided labels may have been individually formatted automatically and/or manually for a given dual-sided strip as described herein. Strip editor 146 may allocate a first portion of the dual-sided strip to a first dual-sided label. For example, strip editor 146 may position the product information side of the first dual-sided label at an X, Y position at page 1. The X position may indicate a horizontal position and the Y position may indicate a vertical position on page 1. Likewise, strip editor 146 may position the product placement information side of the first dual-sided label at an X, Y position at page 2. The X,Y position at page 2 may correspond to the X, Y position on page 1. In this manner, each side of the first dual-sided label may align with one another.

Strip editor 146 may invert the product placement information side of the dual-sided label 180 degrees. Strip editor 146 may be able to do this because the product placement information side of the first dual-sided label may be formatted and stored separately from (but in association with) the product information side of the first dual-sided label. Strip editor 146 may perform such inversion using convention image/text flipping and transformation techniques. In some implementations, a single image of the product placement information side may be generated and the single image may be inverted by strip editor 146. In other implementations, each individual element (e.g., individual graphics, text, etc.) of the product placement information side may be inverted by the strip editor 146 in the same manner so that the entire product placement information side is inverted.

Strip editor 146 may continue to obtain other dual-sided labels for the dual-sided strip and add them similar to the manner in which the first dual-sided label, with the exception that each time that such other dual-sided labels is added, a width of a previous portion allocated to a previous dual-sided label may be used to increment the X position at which a current dual-sided label is to be placed. To maintain the alignment between product information and product placement information sides of each dual-sided label, the same X position may be used for either side of a given dual-sided label. Strip editor 146 may finish formatting a dual-sided strip when the last dual-sided label for the dual-sided strip has been formatted. The result may be a print instruction that includes a first page at which the product information side of the dual-sided labels is printed and a second page at which the product placement information side of the dual-sided labels is printed.

Although the product placement information side is illustrated as being inverted relative to the product information side in the foregoing examples and other examples used throughout this disclosure, the product information side may be inverted relative to the product placement information side instead. Likewise, the product information side need not be on page 1 (or, as will be discussed with respect to FIG. 5C, odd numbered pages) and the product placement information side need not be on page 2. Instead, the product placement information side may be on page 1 (and other odd numbered pages) and the product information side may be on page 2 (and other event numbered pages).

FIG. 5A illustrates a first side of a sheet of dual-sided product placement and information strip, according to an implementation of the invention. According to this implementation, multiple dual-sided strips (Strips 1-6) may be printed on a single sheet of substrate material. other numbers of strips may be printed on a single sheet as well. In the illustrated implementation, the first ("A") side of each of the dual-sided strips (Strips 1-6) may be printed on one side of the sheet. The first side is denoted in the figure as "Strips 1A-6A"). For example, the product information side of each of the dual-sided strips 1-6 may be printed on a first side of the sheet.

FIG. 5B illustrates a second side of a sheet of dual-sided product placement and information strip, according to an implementation of the invention. In the illustrated implementation, the other side of Strips 1-6 (side "B") may be printed on the other side of the sheet of substrate in an inverted manner. Although not illustrated, the "B" side may be printed not inverted relative to the "A" side illustrated in FIG. 5A.

In each of FIG. 5A and 5B, the arrows illustrate delineations such as cut points that indicate where the sheet should be cut or otherwise separated to separate the dual-sided strips. The delineations may be printed or mechanically created. For example, the delineations may include, without limitation, perforations, scoring, guidelines, and/or other techniques to enable the dual-sided strips to be separated from one another. Alternatively or additionally, the printer or other entity may automatically cut the strips at the indicated locations.

Figure 5C:
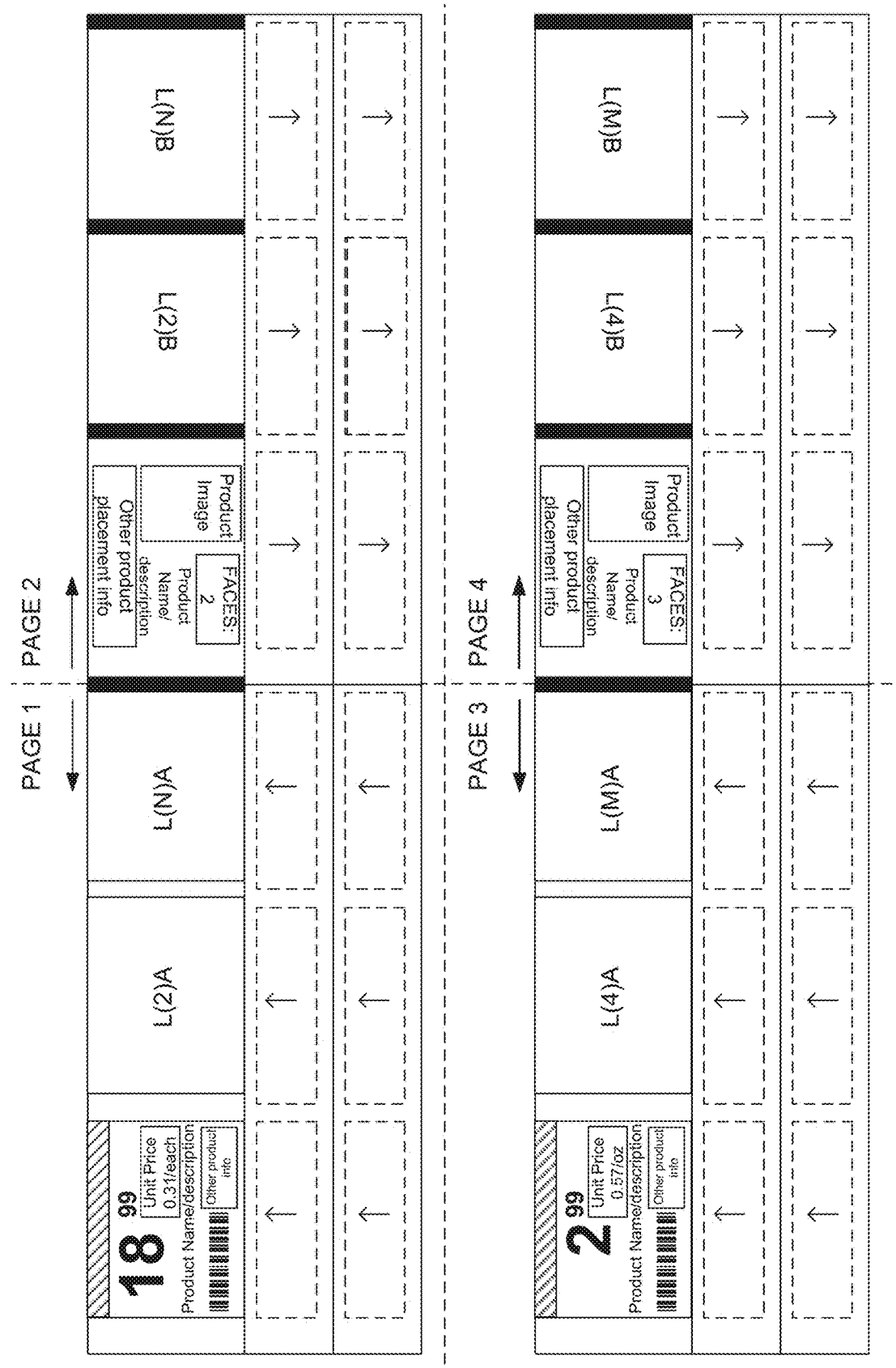
FIG. 5C illustrates an exemplary pagination scheme for one or more sheets of dual-sided product placement and information strips, according to an implementation of the invention.

FIG. 5C illustrates an exemplary pagination scheme for one or more sheets of dual-sided product placement and information strips, according to an implementation of the invention. As illustrated, only some of the dual-sided labels are shown in detail and/or labeled. Others are shown in dashed outline with exemplary relative orientations indicated by a directional arrow for clarity.

The pagination scheme illustrated herein may be generated by strip editor 146 in a manner similar to the manner disclosed with respect to FIG. 4D, except that the strip editor 146 may add multiple sides of dual-sided strips to a given page, and, in some instances, generate print instructions for printing multiple sheets of dual-sided strips.

For example, strip editor 146 may generate print instructions having multiple pages. Each pair of odd and even numbered pages may represent a sheet of a plurality of dual-sided strips. For example, pages 1 and 2 together represent a sheet of a plurality of dual-sided strips, pages 3 and 4 together represent another sheet of another plurality of dual-sided strips, and so on. In this example, page 1 (and other odd numbered pages) may represent the product information side of the plurality of dual-sided strips and page 2 (and other even numbered pages) may represent the product placement information side of the plurality of dual-sided strips. In this manner, the print instructions may specify several dual-sided strips printed on several sheets. Of course, only two pages (pages 1 and 2) for a single sheet of dual-sided strips may be used as well.

To generate the illustrated paginations, strip editor 146 may obtain a maximum number of dual-sided strips per sheet. Such maximum may be predefined (e.g., by a retailer or others designing or otherwise using the dual-sided strips) and/or may be automatically determined based on a size of the substrate to be used for printing and the size of the strips. Strip editor 146 may add strips to each page (similar to the manner described with respect to FIG. 4D), except as a new dual-sided strip is place, the X position may be reset to the original value (e.g., zero or other value indicating a first dual-sided label of the dual-sided strip to be placed), and the Y position may be incremented based on a height of a previous strip that was placed. The height of each strip may be, but is not necessarily, predefined and fixed. When the maximum number of dual-sided strip per sheet is reached (as determined by counting the number of dual-sided strips placed), strip editor 146 may increment the page number to the next odd numbered page, thereby starting a new sheet (assuming that strips are initially placed at page 1).

In some implementations, a plurality of dual-sided strips may be grouped according to various grouping parameters such as, without limitation, an intended display location in the store at which they will be affixed, by store department, and/or other factor. Such groupings may result in a set of the plurality of dual-sided strips being grouped into a sheet (which is paginated on an even and odd numbered page as described herein). For example, a given sheet may have a number of groups of dual-sided strips, according to particular needs.

Furthermore, sheets may be grouped together into print instructions based on similar grouping parameters. For example, a print instruction may be generated for a given department, with each sheet within the print instruction having a corresponding plurality of dual-sided strips for various locations within the department. Other types of groupings may be made as well.

Figure 6A:
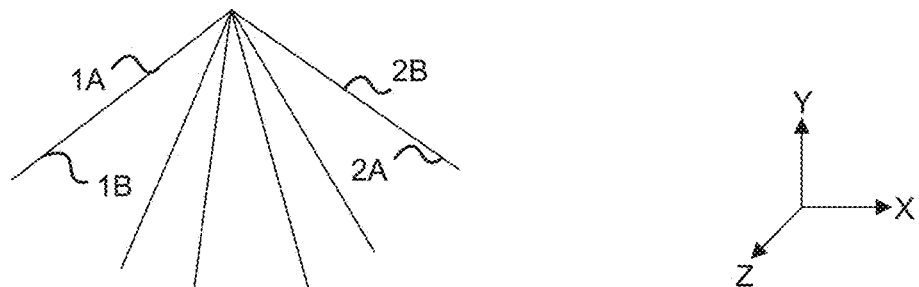
FIG. 6A illustrates a booklet of dual-sided product placement and information strips, according to an implementation of the invention.

FIG. 6A illustrates a booklet of dual-sided product placement and information strips, according to an implementation of the invention. In some implementations, multiple dual-sided strips may be bound together to create of booklet of strips. Each booklet may correspond to a location within a retail location 101. For example, a booklet of dual-sided strips may include dual-sided strips for a particular aisle or set of adjacent shelves or other display areas. As illustrated, the booklet may be created by printing, on a single substrate sheet, two dual-sided strips (Strip 1 having sides Strip 1A and 1B and Strip 2 having sides Strip 2A and 2B). Other configurations of dual-sided sheets on a single substrate sheet may be used as well, as would be apparent based on the disclosure herein.

Figure 6B:
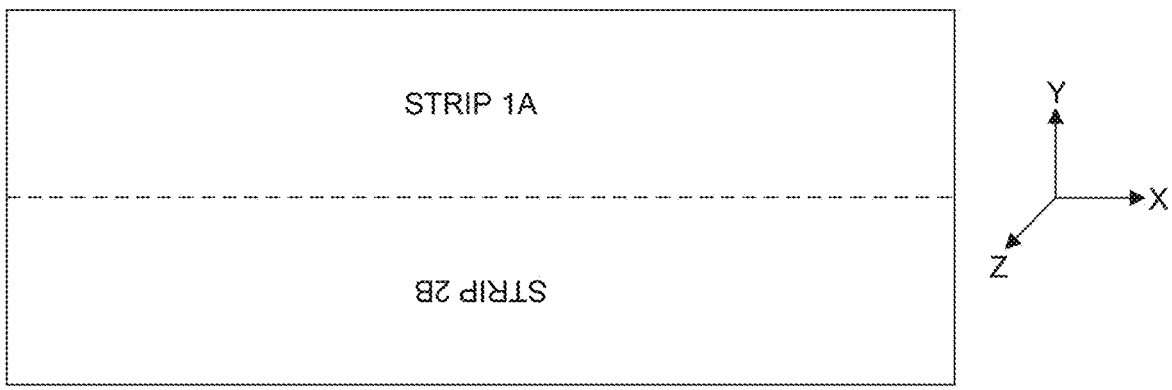
FIG. 6B illustrates a portion of a booklet of dual-sided product placement and information strips, according to an implementation of the invention.

FIG. 6B illustrates a portion of a booklet of dual-sided product placement and information strips, according to an implementation of the invention. In the illustrated implementation, the first side of a first dual-sided strip ("Strip 1A") and the second side of a second dual-sided strip ("Strip 1B") may be printed on a first side of a substrate. Strip 1A may include printed thereon product information for the first dual-sided strip and Strip 2B may include printed thereon product placement information for the second dual-sided strip.

Figure 6C:
FIG. 6C illustrates a portion of a booklet of dual-sided product placement and information strips, according to an implementation of the invention.

FIG. 6C illustrates a portion of a booklet of dual-sided product placement and information strips, according to an implementation of the invention. In the illustrated implementation, which illustrates the other side of the sheet of substrate illustrated in FIG. 6B, the second side of the first dual-sided strip ("Strip 2B") and the first side of the second dual-sided strip ("Strip 2A") may be printed on the second (other) side of the substrate. Strip 1B may include printed thereon product placement information for the first dual-sided strip and Strip 2A may include printed thereon product information for the second dual-sided strip.

As illustrated in FIGS. 6A-6C, the second side of a dual-sided strip is printed inverted relative to the first side. Alternatively, the second side of a dual-sided strip may not be printed inverted relative to the first side.

A given dual-sided strip may be affixed to a display area such as a shelf through mechanical, chemical, or magnetic techniques. For example, a dual-sided strip may be affixed to a display shelf as disclosed in U.S. Pat. No. 7,287,001, entitled "Electronic Product Information Display System," which issued on Oct. 23, 2007, the contents of which are hereby incorporated by reference in its entirety herein.

Exemplary System Architecture

Various systems and methods facilitate these and other aspects of a dual-sided strip. Referring to FIG. 1, for example, system 100 may include a client device 120, a composer computer system 140 that generates print instructions, a printer device 150 that receives the print instructions and prints the dual-sided strip, and/or other components.

Client device 120 may be configured as a personal computer (e.g., a desktop computer, a laptop computer, etc.), a smartphone, a tablet computing device, and/or other device that can be programmed to interact with the composer computer system 140 and/or the planogram database 160 to design a dual-sided strip. Although not illustrated in FIG. 1, client devices 120 may include one or more physical processors programmed by computer program instructions. Client device 120 may be programmed to interface with composer computer system 140 through network 102 to design and edit the layout of a dual-sided strip 170.

In some implementations, client device 120 may operate within a retail location 101. Alternatively or additionally, client device 120 may operate in locations remote from retail location 101. Retail location 101 may include various display aisles 130, each having its own display areas, such as display shelves. Retail location 101 may also include a planogram database 160, which may be located onsite or offsite. Planogram 160 may include a map of retail location 101, locations of products within retail location 101, and/or other conventional planogram information.

Composer computer system 140 may be configured as a server (e.g., having one or more server blades, processors, etc.), a personal computer (e.g., a desktop computer, a laptop computer, etc.), a tablet computing device, and/or other device that can be programmed to generate print instructions for printing a dual-sided strip. Composer computer system 140 may include one or more processors 142 (also interchangeably referred to herein as processors 112, processor(s) 142, or processor 112 for convenience), one or more storage devices 144, and/or other components. Processors 142 may be programmed by one or more computer program instructions. For example, processors 142 may be programmed by strip editor 146, printer interface 148 and/or other instructions that program the composer computer system 140 to perform various operations, each of which are described in greater detail herein. As used herein, for convenience, the various instructions will be described as performing an operation, when, in fact, the various instructions program the processors 142 (and therefore composer computer system 140) to perform the operation.

Creating or Updating Dual-sided Strips

In an implementation, strip editor 146 may generate instructions for printing a new dual-sided strip and/or update existing instructions for a dual-sided strip. Generally speaking, a dual-sided strip may be generated by formatting graphics, text, and/or other content into a layout to be printed onto the dual-sided strip. Strip editor 146 may generate dual-sided strip print instructions based on the formatting.

Strip editor 146 may generate dual-sided strip print instructions for a new dual-sided strip based on input from a user through a graphical user interface ("GUI") or automatically without user intervention based on planogram or other product placement information. Whether or not automatically generated by strip editor 146, the GUI may allow a user to manually edit an existing set of dual-sided strip print instructions as well.

In an implementation, dual-sided labels for individual products may be formatted individually and then added to dual-sided strip print instructions for a given dual-sided strip. For example, strip editor 146 may generate dual-sided label instructions for a product. In this implementation, dual-sided label instructions may correspond to a single product. The term "dual-sided label instructions" as used herein refers to a set of instructions for printing two sides of a dual-sided strip for a given product. As such, the dual-sided label instructions may include first instructions for printing product information on one side of a dual-sided strip and second instructions for printing product placement information on the other side of the dual-sided strip. The dual-sided label instructions may be stored in a database, such as dual-sided strip database 162. Such stored label instructions may be selected from the database and later added to a given set of dual-sided strip instructions.

In an implementation, strip editor 146 may include multiple dual-sided label instructions into a set of dual-sided strip instructions. In this manner, a single dual-sided strip printed using the dual-sided strip instructions may have printed thereon information for a plurality of products. It should be noted that each set of dual-sided label instructions may be separately stored as a discreet instructions for a corresponding product. These dual-sided label instructions may be stored in a database, such as dual-sided strip database 162. In this implementation, dual-sided strip instructions for a single dual-sided strip may include a collection of pointers that each point to discreet dual-sided label instructions for products to be included in the dual-sided strip, as well as coordinate information that keeps track of the location for each set of dual-sided label instructions for printing on a dual-sided strip. Alternatively or additionally, dual-sided strip instructions for a single dual-sided strip may include the actual dual-sided label instructions.

When printing multiple products onto a single dual-sided strip, strip editor 146 may keep track of the spacing required for each product, as specified in the product's dual-sided label. In this manner, for single head printing operations, strip editor 146 may transform coordinates for printing a second side in an inverted fashion, if necessary.

Figure 7A:
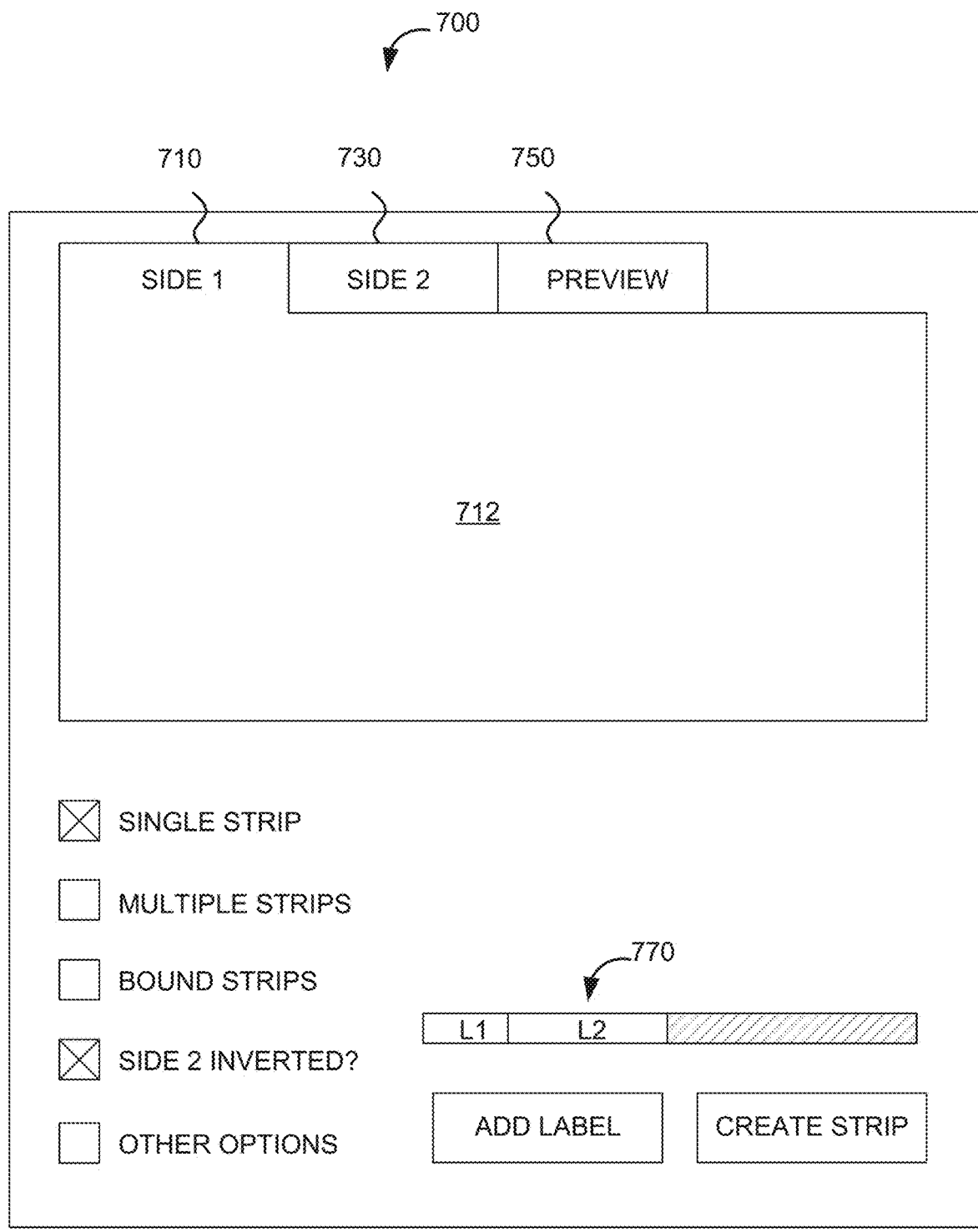
FIG. 7A illustrates an exemplary interface for editing a dual-sided product placement and information strip, according to an implementation of the invention.
Figure 7B:
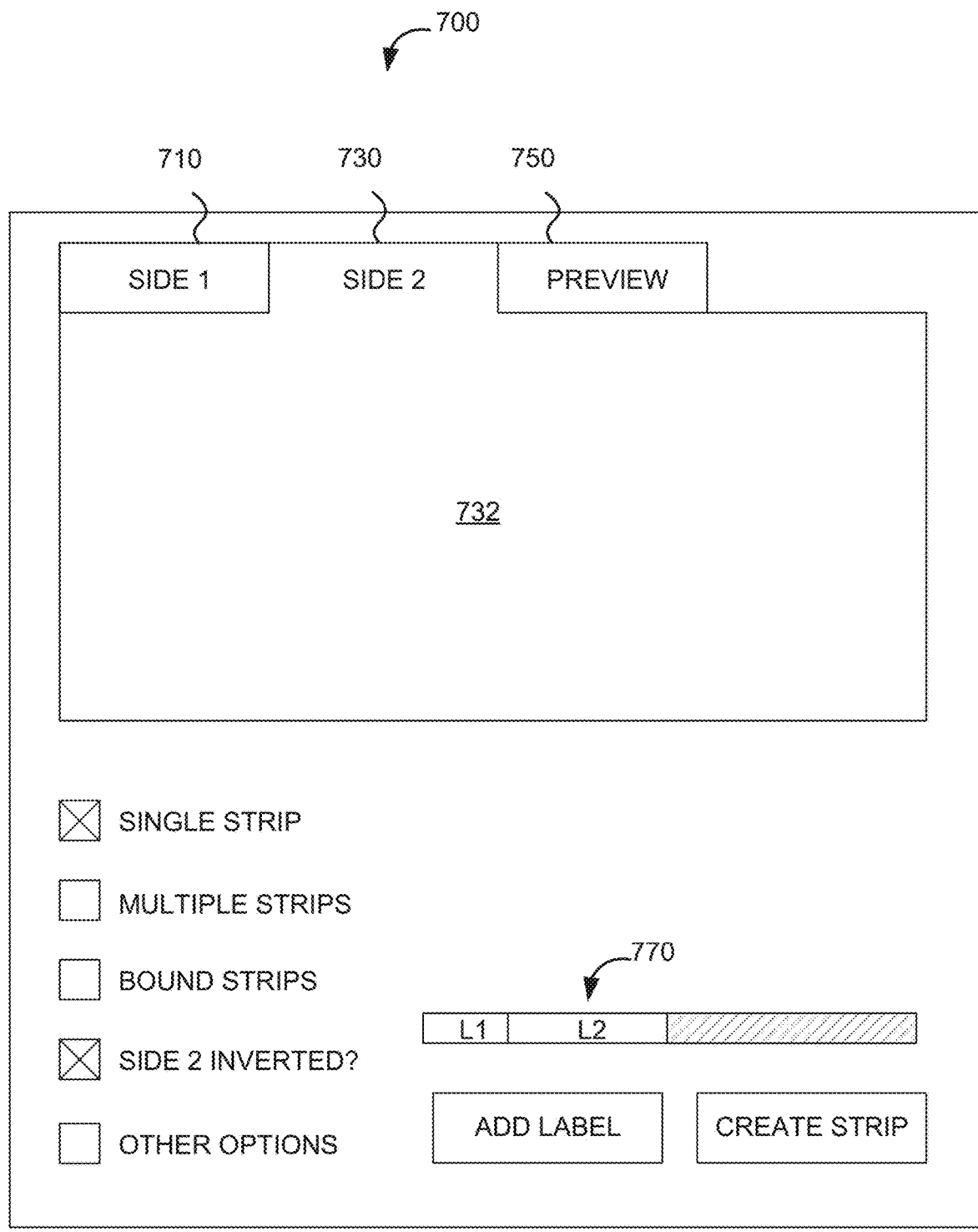
FIG. 7B illustrates an exemplary interface for editing a dual-sided product placement and information strip, according to an implementation of the invention.
Figure 7C:
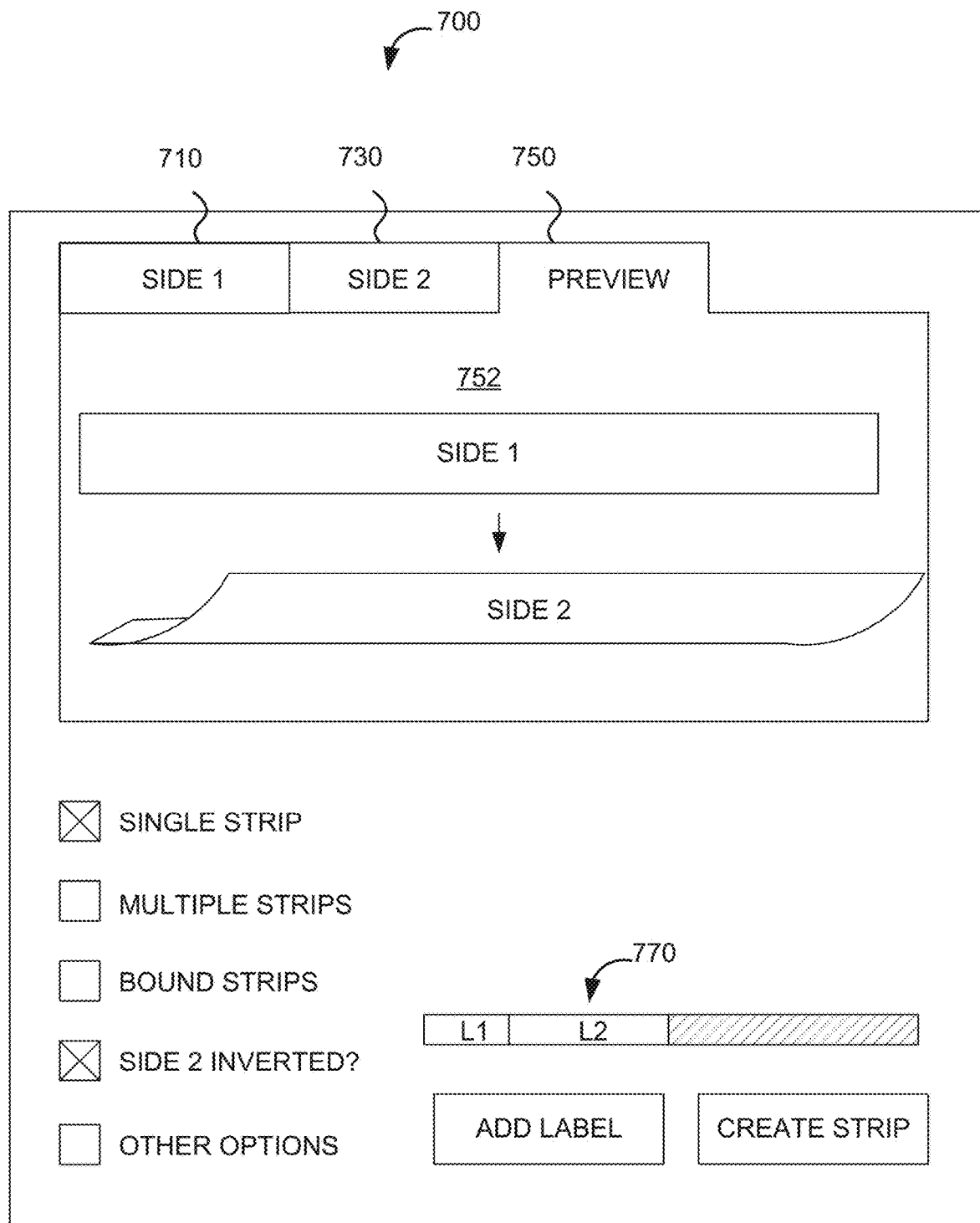
FIG. 7C illustrates an exemplary interface for editing a dual-sided product placement and information strip, according to an implementation of the invention.

For human-formatted dual-sided strips, strip editor 146 may generate a user interface, such as an interface 700 illustrated in FIGS. 7A-7C. The interface may be used to view and/or edit existing dual-sided strips as well. Referring generally to FIGS. 7A-C, interface 700 may include various display options configured to receive input. For example, a display option 710, when selected, may cause editing options 712 for a first side (e.g., a product information side) of a dual-sided strip to be displayed. A display option 730, when selected, may cause editing options 732 for a second side (e.g., a product placement information side) of a dual-sided strip to be displayed. A display option 750, when selected, may cause a preview of dual-sided strip(s) being designed. A display option 770 may provide a visual indication of the progress of formatting a dual-sided strip. For example, section L1 may indicate a label for a first product has been formatted on the dual-sided strip and section L2 may indicate a label for a second product has been formatted on the dual-sided strip. The hashed section may indicate other label(s) for other products to be formatted on the dual-sided strip.

Various other display options may enable configuration of dual-sided strips. For example, a SINGLE STRIP display option, when selected, may configure interface 700 to provide design options for a single dual-sided strip to be display. A MULTIPLE STRIPS display option, when selected, may configure interface 700 to provide design options for designing multiple dual-sided strips on a sheet to be displayed. For example, when this display option is selected, interface 700 may enable toggling between different dual-sided strips to be edited for printing on a sheet. A BOUND STRIPS display option, when selected, may configure interface 700 to provide design options for designing multiple dual-sided strips to be bound. When this display option is selected, interface 700 may enable toggling between different dual-sided strips to be edited for printing on a sheet, and also a manner of binding/how each dual-sided strip is oriented with respect to one or more other dual-sided strips (e.g., to achieve the configuration illustrated in FIGS. 6A-C.

An ADD LABEL display option, when selected, may configure interface 700 to provide design options for adding a new label for a product. Such labels and other product information may be designed according to the various interfaces and systems disclosed in U.S. Pat. No. 7,287,001, which was previously incorporated by reference. A CREATE STRIP display option, when selected, may finalize the formatting of one or more dual-sided strips being designed.

Referring specifically to FIG. 7C, interface 700 may, upon selection of the PREVIEW 750 display option, provide a preview display 752 of a dual-sided strip being designed. The preview display 752 may enable a user to view each side of the dual-sided strip being designed. For instance, one or more display options (not illustrated) may be provided that allows the dual-sided strip being designed to be flipped to the opposite side so that the user can visualize how the strip will look when printed. Conventional JAVASCRIPT using multiple images may be used to achieve such an effect. Other program languages (such as MICROSOFT SILVERLIGHT, ADOBE FLASH, etc.) may be used as well.

For automatically generated (without human design intervention) dual-sided strips, strip editor 146 may obtain planogram information for a portion or all of a retail location and automatically format dual-sided strips for each. Doing so assumes that the necessary product information and product placement information is available. To the extent that any required information is missing, strip editor 146 may generate an error. To the extent that any optional information is missing (e.g., an image of the product for the product placement information), default information may be provided instead (e.g., "no image available" or simply "N/A").

In some implementations, the dual-sided print instructions may be provided to a printer interface (e.g., printer interface 148), which generates printer readable encodings for a printer device 150. The printer readable encodings may include printer-specific instructions (such instructions from a printer driver) or general instructions (such as a PostScript or other format).

Printer Device 150

Printer device 150 may include an inkjet printer, a laser printer, and/or other type of printer configured to print on a dual-sided strip substrate described herein. Printer device 150 may be include a single print head or two or more print heads (e.g., dual print head). The term "print head" is intended to mean one or more components of a printing apparatus that prints on a single side of a substrate. Single print head implementations may print a single side at a time and automatically or manually reverse the dual-sided strip substrate for printing the other side, while dual print head implementations may print both sides at a time or a single side at a time without having to automatically or manually reverse the dual-sided strip substrate for printing the other side.

Figure 8:
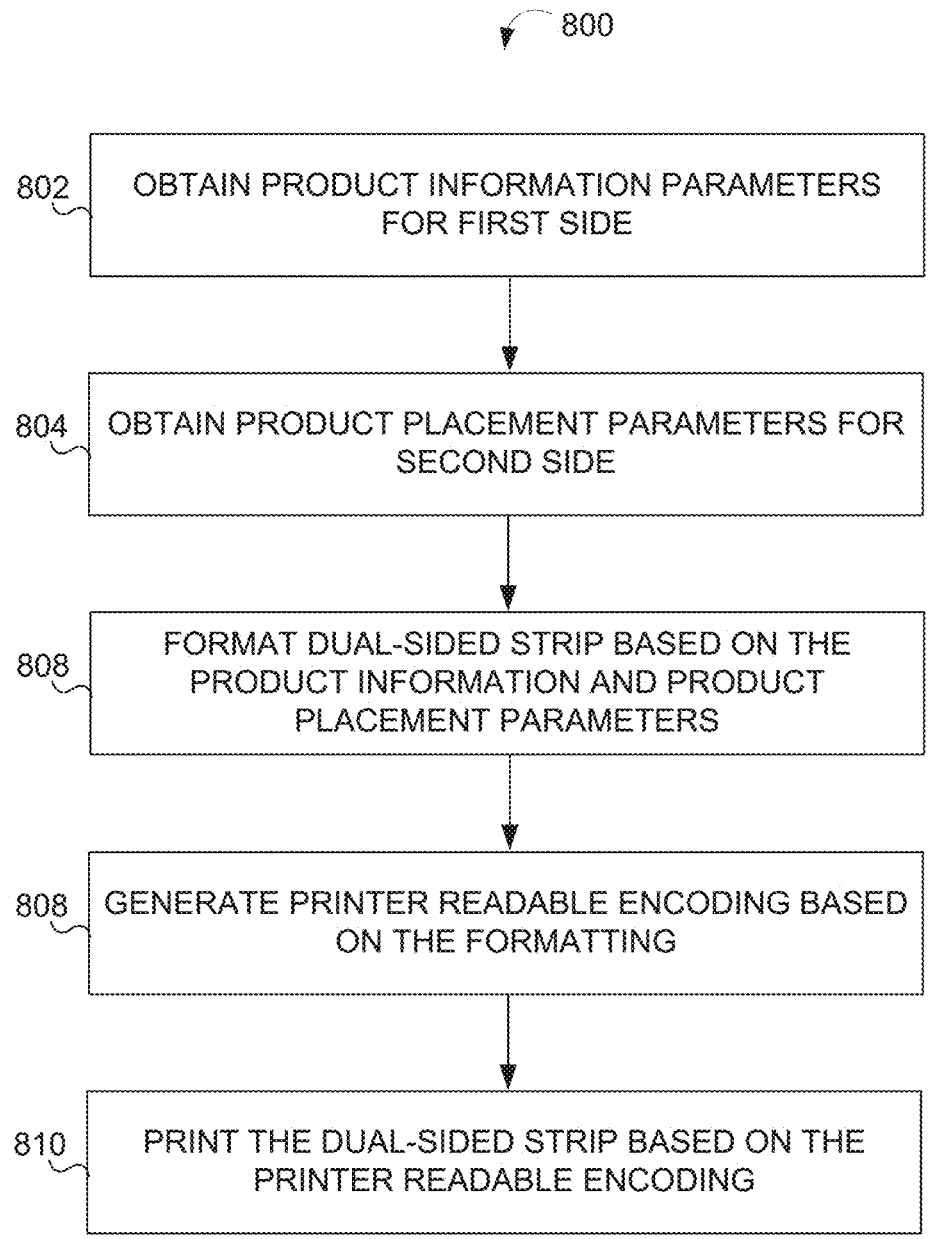
FIG. 8 depicts a process of generating a sheet of dual-sided product placement and information strips, according to an implementation of the invention.

FIG. 8 depicts a process 800 of generating a sheet of dual-sided product placement and information strips, according to an implementation of the invention.

In an operation 802, process 800 may include obtaining product information parameters for a first side of the dual-sided strip. The product information parameters may be input from a user via a user interface and/or from an automated process. The product information parameters may include product information to be printed on the first side (e.g., consumer-facing side) of the dual-sided strip.

In an operation 804, process 800 may include obtaining product placement parameters for a second side of the dual-sided strip. The product placement information parameters may be input from a user via a user interface and/or from an automated process. The product placement parameters may include product placement information to be printed on the second side (e.g., shelf-facing side) of the dual-sided strip.

In an operation 806, process 800 may include formatting the dual-sided strip based on the product information parameters and the product placement parameters. Such formatting may arrange the information to be printed on the dual-sided strip. The formatting may be output as a format file. The format file may, in some implementations, be in a human readable format such as Extensible Markup Language format, JAVASCRIPT Object Notation format, and/or other formats.

In an operation 808, process 800 may include generating a printer-readable encoding based on the formatting. For example, process 800 may take the format file from operation 806 as an input and generate a printer-readable encoding for a printer. Such encoding may be generic for all printers or specific for a given type/manufacturer of the printer (e.g., generated by a printer-specific printer driver). In an operation 810, process 800 may include printing the dual-sided strip based on the printer-readable encoding.

Using a dual-sided strip with dual-sided printed information for a plurality of products, stocking personnel may locate a position of the products on a display area such as a shelf. Each of the products may have product placement information printed on one side of the dual-sided strip and product information on the other, consumer-facing, side. In this manner, the stocking personnel may switch back and forth between each side of the dual-sided strip to stock the shelf with the products, while properly maintaining alignment of the product information and the products on the shelf.

Although illustrated in FIG. 1 as a single component, composer computer system 140 and Client devices 120 may each include a plurality of individual components (e.g., computer devices) each programmed with at least some of the functions described herein. In this manner, some components of composer computer system 140 and/or client device 120 may perform some functions while other components may perform other functions, as would be appreciated. The one or more processors 142 may each include one or more physical processors that are programmed by computer program instructions. The various instructions described herein are exemplary only. Other configurations and numbers of instructions may be used, so long as the processor(s) 142 are programmed to perform the functions described herein.

Furthermore, it should be appreciated that although the various instructions are illustrated in FIG. 1 as being co-located within a single processing unit, in implementations in which processor(s) 142 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 142 may be programmed by one or more additional instructions that may perform some or all of the functionality attributed herein to one of the instructions. As yet another example, client device 120 may be programed with some or all of the functions of composer computer system 140.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various databases 160, 162 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data. The databases 160, 162 may be onsite, such as at a retail location 101 or within composer computer system 140, offsite at a remote location, offsite at a networked storage provider (e.g., AMAZON S3 storage), and/or other location so long as it is accessible to system 100.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various processing operations and/or data flows depicted in the figures may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

The term "exemplary" as used herein is intended to mean "example of." Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system of generating a dual-sided product strip comprising a first side having printed thereon product information and a second side having printed thereon product placement information that guides placement of products on a product display, wherein the dual-sided product strip is to be printed on a sheet comprising two or more paginated sections, the system comprising:
    a computer system comprising one or more physical processors programmed by computer program instructions that, when executed, program the computer system to:
        obtain first product information for a first product to be printed on the first side of the dual-sided product strip and first product placement information for the first product to be printed on the second side of the dual-sided product strip, wherein the first product information and the first product placement information correspond to a first dual-sided label for the first product;
        obtain second product information for a second product to be printed on the first side of the dual-sided product strip and second product placement information for the second product to be printed on the second side of the dual-sided product strip, wherein the second product information and the second product placement information correspond to a second dual-sided label for the second product;
        allocate a first dual-sided portion of the dual-sided product strip for the first dual-sided label, wherein the first product information is allocated to be printed on a side of the first dual-sided portion corresponding to the first side of the dual-sided product strip and the first product placement information is allocated to be printed on a side of the first dual-sided portion corresponding to the second side of the dual-sided product strip;
        invert the first product information relative to the first product placement information, or the first product placement information relative to the first product information, for printing the first dual-sided label at the first dual-sided portion;
        allocate a second dual-sided portion of the dual-sided product strip for the second dual-sided label, wherein the second product information is allocated to be printed on the first side of the dual-sided product strip based on the second dual-sided portion;
        invert the second product information relative to the second product placement information, or the second product placement information relative to the second product information, for printing the second dual-sided label at the second dual-sided portion;
        generate dual-sided print instructions based at least on the first dual-sided portion, the first product information, the first product placement information, the inversion of the first product information or the first product placement information, the second dual-sided portion, the second product information, the second product placement information, and the inversion of the second product information or the second product placement information; and
        generate a printer-readable encoding based on the dual-sided print instructions,
    wherein to generate the dual-sided print instructions, the computer system is programmed to:
        format the first side of the dual-sided product strip, including the first product information and the second product information, to be printed on a first paginated section; and
        format the second side of the dual-sided product strip, including the first product placement information and the second product placement information, to be printed on a second paginated section.

2. The system of claim 1, wherein the first product information or the first product placement information occupies a first amount of space on the dual-sided product strip, and wherein the first dual-sided portion is allocated based on the first amount of space.

3. The system of claim 2, wherein to allocate the second dual-sided portion, the computer system is programmed to identify a position of the second dual-sided portion on the dual-sided product strip based on the first dual-sided portion.

4. The system of claim 1, wherein a second dual-sided product strip is to be printed on the sheet, wherein the computer system is further programmed to:
    format a first side of the second dual-sided product strip to be printed on a third paginated section; and
    format a second side of the second dual-sided product strip to be printed on a fourth paginated section.

5. The system of claim 4, wherein the computer system is further programmed to:
    generate an instruction to generate a delineation between the dual-sided product strip and the second dual-sided product strip.

6. The system of claim 1, wherein a plurality of other dual-sided product strips are to be printed on the sheet, wherein the computer system is further programmed to:
    format a first side of each of the plurality of dual-sided product strips to be printed on corresponding odd-numbered paginated sections; and
    format a second side of each of the plurality of dual-sided product strips to be printed on corresponding even-number paginated sections.

7. The system of claim 6, wherein the computer system is further programmed to:

allocate a plurality of group portions each occupying a portion of the sheet, wherein each group portion corresponds to a group of dual-sided product strips to be printed on the sheet; and assign the dual-sided product strip and each of the plurality of dual-sided product strips to a corresponding group of dual-sided product strips.

8. The system of claim 1, further comprising:

a printer device configured to obtain the printer-readable encoding and print the dual-sided product strip based on the printer-readable encoding.

9. A system of generating a dual-sided product strip comprising a first side having printed thereon product information and a second side having printed thereon product placement information that guides placement of products on a product display, wherein the dual-sided product strip is to be printed on a sheet comprising two or more paginated sections, the system comprising:

a computer system comprising one or more physical processors programmed by computer program instructions that, when executed, program the computer system to:

obtain product information parameters for the first side of the dual-sided product strip;

obtain product placement parameters for the second side of the dual-sided product strip;

generate dual-sided print instructions based on the product information parameters and the product placement parameters; and generate a printer-readable encoding based on the dual-sided print instructions, wherein to generate the dual-sided print instructions, the computer system is further programmed to:

format the first side of the dual-sided product strip to be printed on a first paginated section based on the product information parameters; and format the second side of the dual-sided product strip to be printed on a second paginated section based on the product placement parameters.

10. The system of claim 9, wherein the dual-sided product strip comprises a plurality of dual-sided labels each to be printed on the dual-sided product strip and each corresponding to a product to be displayed, and wherein the product information parameters comprise first product information for a first product and second product information for a second product to be printed on the first side of the dual-sided product strip, and wherein the product placement parameters comprise first product placement information for the first product and second product placement information for the second product to be printed on the second side of the dual-sided product strip.

11. A dual-sided product strip for placing a plurality of products on a display, wherein the dual-sided product strip is printed on a sheet comprising two or more paginated sections, the dual-sided product strip comprising:

a single strip of substrate material, the single strip of substrate material comprising a first side and a second side, wherein the first side has printed thereon, for each of the plurality of products, product information that describes the product, wherein the second side has printed thereon, for each of the plurality of products, product placement information different than the product information and configured to guide placement of a corresponding product on the display, the product placement information comprising at least a first indicator that guides placement of a first product on a shelf and a second indicator that guides placement of a second product on the shelf, and wherein the first side is printed on a first paginated section of the sheet and the second side is printed on a second paginated section of the sheet.

12. The dual-sided product strip of claim 11, wherein a first dual-sided portion of the dual-sided product strip is allocated for a first product of the plurality of products, wherein the first dual-sided portion has printed thereon first product information printed on the first side of the dual-sided product strip and first product placement information printed on the second side of the dual-sided product strip, wherein the first product information is printed in an inverted orientation relative to the first product placement information.

13. The dual-sided product strip of claim 12, wherein a second dual-sided portion of the dual-sided product strip is allocated for a second product of the plurality of products, wherein the second dual-sided portion has printed thereon second product information printed on the first side of the dual-sided product strip and second product placement information printed on the second side of the dual-sided product strip, wherein the second product information is printed in an inverted orientation relative to the second product placement information.

14. A printed sheet comprising a plurality of dual-sided product strips, each dual-sided product strip used for placing a plurality of products on a display, the printed sheet comprising:

a single sheet of substrate material, the single sheet of substrate material comprising a first side and a second side, wherein the first side has printed thereon, for each of the plurality of dual-sided product strips, product information that describes each of the plurality of products corresponding to each dual-sided product strip, wherein the second side has printed thereon, for each of the plurality of dual-sided product strips, product placement information different than the product information and configured to guide placement of each of the plurality of products corresponding to each dual-sided product strip, the product placement information comprising, for each dual-sided product strip, at least a first indicator that guides placement of a first product on a shelf and a second indicator that guides placement of a second product on the shelf, and wherein the single sheet comprises two or more paginated sections, and wherein the first side is printed on a first paginated section of the sheet and the second side is printed on a second paginated section of the sheet.

15. The sheet of claim 14, wherein the plurality of dual-sided product strips comprise at least a first dual-sided product strip and a second dual-sided product strip, the printed sheet further comprising:

a delineation between at least the first dual-sided product strip and the second dual-sided product strip.

16. The sheet of claim 15, wherein the delineation comprises at least one of a perforation, a scoring, or a printed indicator.

17. The sheet of claim 14, wherein the plurality of dual-sided product strips comprise at least a first dual-sided product strip, and wherein first product information for a first product on the first dual-sided product strip is printed in an inverted orientation relative to first product placement information for the first product.

* * * * *